United States Patent
Olszak

(10) Patent No.: US 9,581,428 B2
(45) Date of Patent: Feb. 28, 2017

(54) TIME-MULTIPLEXED SPECTRALLY CONTROLLED INTERFEROMETRY

(71) Applicant: Artur Olszak, Tucson, AZ (US)

(72) Inventor: Artur Olszak, Tucson, AZ (US)

( * ) Notice: Subject to any disclaimer, the term of this patent is extended or adjusted under 35 U.S.C. 154(b) by 0 days.

(21) Appl. No.: 14/832,052

(22) Filed: Aug. 21, 2015

(65) Prior Publication Data

US 2016/0282102 A1    Sep. 29, 2016

Related U.S. Application Data

(60) Provisional application No. 62/043,366, filed on Aug. 28, 2014.

(51) Int. Cl.
  *G01B 9/02*    (2006.01)
(52) U.S. Cl.
  CPC ................ *G01B 9/02004* (2013.01)
(58) Field of Classification Search
  CPC ............ G01B 9/02002; G01B 9/02004; G01B 9/0201
  USPC ........................................ 356/451, 454, 484
  See application file for complete search history.

(56) References Cited

U.S. PATENT DOCUMENTS

| 8,422,026 | B2 | 4/2013 | Olszak |
| 8,675,205 | B2 | 3/2014 | Olszak |
| 8,810,884 | B1 | 8/2014 | Olszak |
| 2004/0190002 | A1* | 9/2004 | Schulte ............. G01B 11/2441 356/512 |

* cited by examiner

*Primary Examiner* — Jonathan Hansen
(74) *Attorney, Agent, or Firm* — Antonio R. Durando

(57) ABSTRACT

A tunable light source having a temporal coherence length such that interference fringes are detected within the optical path difference of the interferometer is spectrally controlled to produce multiple wavelengths during sequential fractions of the integration time of the detector of the interferometer. The wavelengths are selected so as to produce a visible correlogram at each integration time according to spectrally controlled interferometry (SCI) principles. Such different wavelengths may be produced by stepwise or continuous modulation. The modulation step is repeated sequentially while changing the period of modulation to produce a succession of predetermined spatial patterns of interference fringes, as required for interferometric measurements. The approach enables the practice of SCI with common-path apparatus used for conventional phase shifting, thereby combining the advantages of high-coherence and white-light interferometry.

12 Claims, 3 Drawing Sheets

TIME-MULTIPLEXED SPECTRALLY CONTROLLED INTERFEROMETRY

RELATED APPLICATIONS

This application is based on and claims the priority of U.S. Provisional Application No. 62/043,366, filed Aug. 28, 2014, which is hereby incorporated by reference in its entirety.

BACKGROUND OF THE INVENTION

Field of the Invention

This invention relates in general to the field of interferometry and, in particular, to a novel approach to providing a spectrally controlled source of interferometric light using time-averaged exposure.

Description of the Prior Art

Spectrally controlled interferometry ("SCI") is a recently developed interferometric technique that allows implementation of white light interferometry ("WLI") measurement schemes in common-path interferometers. See U.S. Pat. No. 8,422,026, U.S. Pat. No. 8,810,884 and U.S. Pat. No. 8,675,205, all hereby incorporated by reference. In contrast to conventional, high-coherence, laser interferometry, WLI is characterized by the absence of coherent noise because of the light's short coherence length, typically on the order of a few micrometers. Typically, coherent noise is one of the main sources of measurement errors in conventional interferometry.

Despite these difficulties, laser interferometry is extremely popular and useful because it allows the use of common-path interferometer designs—a particular class of devices in which most of the errors introduced by the optical system cancel out. This allows the manufacture of less expensive and more accurate instruments. High-coherence interferometry is also described as producing a non-localized interference pattern because the interference of beams occurs over a large volume of space, which is an advantage in setting up the measurement apparatus.

WLI is immune to the coherent-noise problems of laser interferometers but requires careful balancing of the optical path difference between the test and reference arm of the interferometer (OPD) so that interference can take place in the measurement space (i.e., within the coherence length of the light). Such arrangements can be complex and prevent the use of common-path interferometers, therefore forfeiting the above-described advantages. In the art, it is said that WLI produces localized interference because it is visible only in a limited volume around zero OPD.

SCI successfully combines both approaches and provides the advantages of both common-path interferometry and WLI. SCI produces localized interference in an unbalanced OPD interferometer and thus allows, for example, the use of a Fizeau interferometer in WLI mode, thus eliminating the problem of coherent noise. One of the major advantages of SCI is that existing instrumentation can be adapted to its modality of operation by replacing only the laser light source with one capable of proper spectral modulation. Therefore, such a light source and its proper modulation are of primary importance to the successful implementation of SCI.

To date, SCI has been implemented using broadband sources with filtering schemes (such as a Fabry-Perot etalon) to shape the source into a spectrally controlled source. These approaches suffer from loss of light and mechanical complexity, making them impractical. This disclosure is directed at a new concept for a source and a method of wide range spectral-modulation that is particularly suitable for SCI implementation because free of mechanical parts and, therefore, more robust and practical to implement.

SUMMARY OF THE INVENTION

The concept of the invention lies in a tunable light source having a temporal coherence such that interference fringes are detected within the measurement space of the interferometric apparatus. The source is spectrally controlled to produce multiple wavelengths during sequential fractions of the integration time of the detector of the interferometer. The wavelengths are selected so as to produce a visible correlogram at each integration time according to SCI principles. Such different wavelengths may be produced as a result of a stepwise or continuous modulation, such as in sinusoidal modulation. The modulation step is repeated sequentially at each detector integration time to produce a succession of predetermined spatial patterns of interference fringes as required for interferometric analysis.

Utilizing a tunable light source according to the invention for spectrally controlled interferometry, sequential frames of phase shifted correlograms can be produced with common-path apparatus that is conventionally used with mechanical phase shifting. This combines the advantages of conventional high-coherence interferometry with those of white-light interferometry.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE INVENTION

Figure 1:
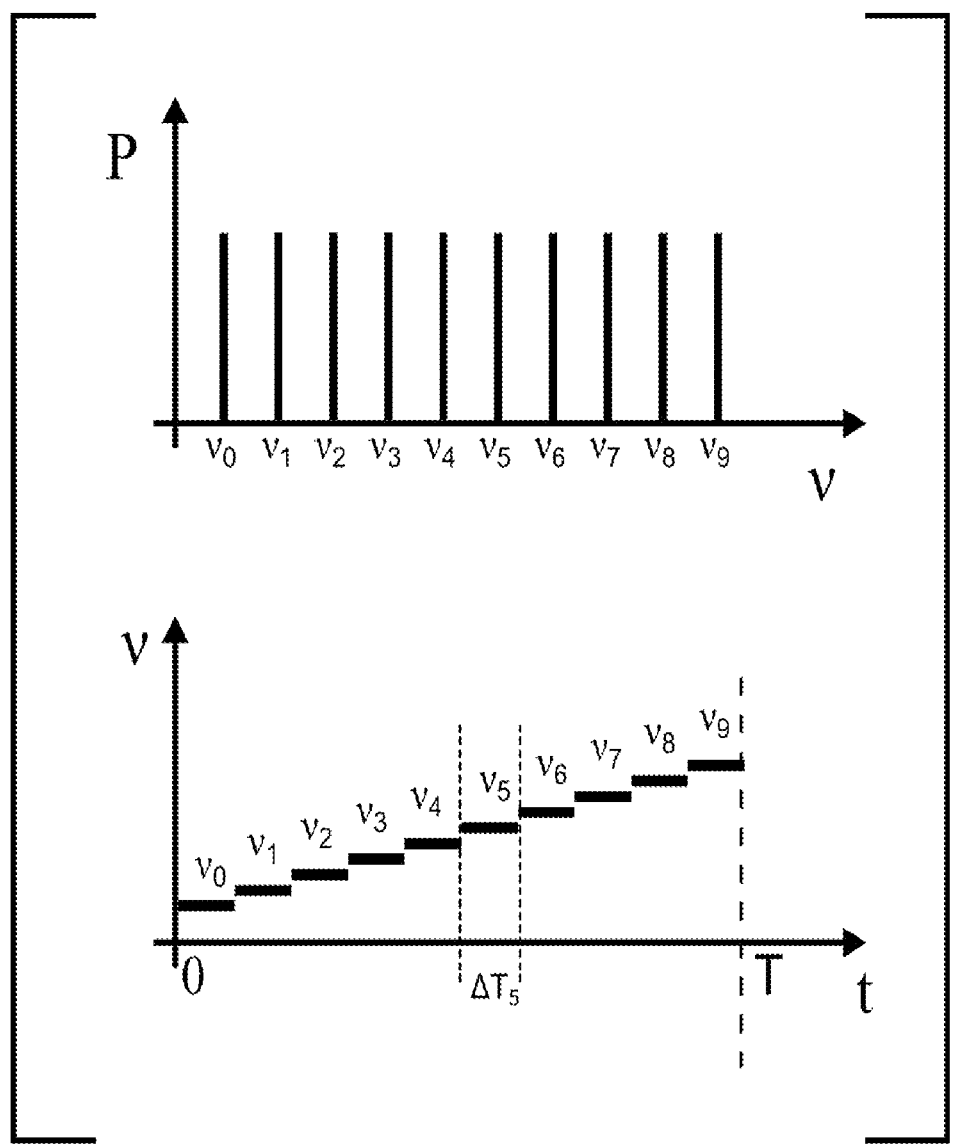
FIG. 1 illustrates time and power graphs of a discrete time multiplexed exposure. The upper graph shows the spectral power of the source accumulated during a single integration time T of the detector as a function of optical frequency v.

As used in this disclosure, "white light" is intended to refer to any broadband light of the type used in the art of white-light interferometry, typically having a bandwidth in the order of many nanometers. "Monochromatic" light, on the other hand, is intended to refer to any high-coherence narrowband light capable of producing high-contrast interference fringes within the entire measurement space of the particular apparatus utilizing such light as a source. For the purposes of this disclosure, a source is defined as "temporally coherent" if, at any given time, interference fringes can be detected within the measurement space of the interferometric apparatus used to implement SCI. With reference to light in general, the terms "frequency" and "wavelength" are used alternatively, as commonly done in the art, because of their well known inverse relationship. "Optical path difference" or "OPD" and "time delay" are used alternatively because of their space/time relationship in interferometry. As normally done in the art with reference to interferometric apparatus, "optical path difference" and "OPD" are also used to refer to the difference between the lengths of the optical paths of the test and reference arms of the apparatus. Similarly, "sine" and "cosine," as well as related terms, are used alternatively unless specifically indicated otherwise. The terms "modulate" and "modulation" are used herein in connection with a light source in the broadest sense to include any alteration of the frequency distribution, amplitude distribution or phase distribution of energy produced by the light source, and to the synthesis of a light signal having a desired frequency, amplitude and phase distribution by any means. With reference to a light source, the term "extended" refers to any spatially incoherent light source, as contrasted to a spatially coherent source, such as a point source generated by a focused laser beam.

Typically, interferometers that implement SCI capture interference images using an integrating detector, such as an electronic camera or photographic media. Integrating detectors develop an image by accumulating photons over a finite time such that the resulting image is a time integral of the instantaneous exposure to the interference pattern. The time during which one image is accumulated by the detector is normally referred to in the art as the "integration time." The fact that a detected image is not formed instantaneously, but rather over the integration time, allows the implementation of SCI by sequentially exposing the detector to multiple and independent interference-fringe signals during a single integration time. This is the crux of the present invention.

Accordingly, each integration time is split into several independent "fractions" with corresponding "exposures," each obtained using a single, but different, wavelength. In a basic implementation, each exposure is obtained using a monochromatic source, i.e., a source with sufficient temporal coherence to produce the desired interference fringes (typical high temporal coherence sources have a wavelength bandwidth in the order of 1 MHz).

The cumulative effect of such multiple exposures is that the final detected correlogram is a superposition of individual fringe signals, which is equivalent to registering the interference pattern produced by multiple wavelengths simultaneously, as is done in a basic implementation of SCI using a polychromatic source (described in U.S. Pat. No. 8,422,026). The ability to sequentially expose the detector to independently formed interference-fringe signals during the integration time of the detector will be referred to herein as "time multiplexing."

By sequentially illuminating the sample object with a fast-varying, wavelength-adjustable, temporally coherent source, time multiplexing overcomes the difficulty of producing spectrally controlled light where all or the majority of wavelengths are present simultaneously. Such temporally coherent sources suitable for the invention are available today and widely used in optical coherence tomography and other applications. See, for example, the MEMS-Tunable Vertical Cavity Surface Emitting Laser (VCSEL) used in Thorlabs' OCS1310V1 Swept Source Optical Coherence Tomography (SS-OCT) System.

For the purposes of the invention, a tunable light source is used that can be considered temporally coherent for the purposes of the measurement (i.e., capable of producing high-contrast interference fringes in a particular setup). Assume that the detector (for example a CMOS, a CCD camera, or a photographic medium) is exposed over a finite integration time T. In a typical high-coherence interferometer, the source wavelength stays constant during the entire exposure time and produces a corresponding interference pattern. Such image represents a time integral of the instantaneous detector exposures and can be described by the equation:

$$I_T = \int_0^T I(t)dt \tag{1}$$

where $I_T$ is the total exposure of the detector and $I(t)$ is the instantaneous intensity of the interference pattern at any time t.

In conventional interferometry the function $I(t)$ is constant (I), so the resulting cumulative intensity $I_T$ is equal to the product I times the integration time T. In general, the interference pattern $I(t)$ is described by the equation:

$$I(t) = \int_0^{\infty} E(t,v)E^*(t-\tau,v)dv \tag{2}$$

where E is the complex amplitude of light, v is the optical frequency of light ($v = c/\lambda$, c is the speed of light, $\lambda$ is the wavelength), $\tau$ is the time delay between the reference and object beams), and * denotes the complex conjugate. The resulting equation takes the form:

$$I(t) = \int_0^T \int_0^{\infty} E(t,v)E^*(t-\tau,v)dvdt \tag{3}$$

In general the objective of SCI is to produce high-visibility interference fringes at a given distance from the reference surface, which corresponds to the time delay $\tau$ in equation (2). This can be achieved by manipulating the spectral distribution of the source. SCI applications described in the prior art assume no time dependency in equation (3) and concentrate on methods for modulating the light spectrum directly, either by filtering it or by inserting a Fabry-Perot etalon in the light path. According to the invention, an alternative way to achieve the same effect of spectral source modulation is attained by using a monochromatic source and allowing the wavelength to vary with time in a controllable fashion.

One way to implement the concept of the invention is by time multiplexing the source wavelength such that the cumulative effect of exposing the detector to a sequence of exposures is the same as modulating all wavelengths of the source at once. In its simplest implementation, this can be achieved by changing the wavelength in a monochromatic source in each exposure in discrete steps of equal length with the result of producing the cumulative effect of a source with multiple discrete, equally spaced wavelengths. Example graphs of wavelength and power distribution of such approach are shown in FIG. 1. The upper graph shows the cumulative spectral power, P, as a function of optical frequencies, v (equivalent to the spectral power accumulated during each integration time T). Each of the wavelengths is recorded separately during the integration time, as described above. The cumulative source is composed of ten independent wavelengths, each with an optical frequency denoted by $v_n$, where n varies from 0 to 9. The lower graph shows the optical frequency variation with time to achieve the power effect shown in the upper graph. As time progresses during each interval of integration time, the wavelength of the source is switched from one discrete wavelength to another. The same process is repeated for each integration time of the detector, so a stable interferometric image is achieved at each frame. The intervals of the time exposure corresponding to each optical frequency are marked. For example, the exposure time for the 6-th wavelength is marked as $\Delta T_5$. The integration time is denoted as T.

Assuming, for instance, that a camera is used with an integration time of 100 ms (i.e., the frame rate is approximately 10 Hz), then it would be possible to illuminate the interferometer sequentially with 10 different wavelengths, each taking 10 ms, to cumulatively add up to 100 ms. (Note that the actual frame rate would be lower than that because of small overhead in electronic processing, but for the purposes of describing the invention this effect can be neglected.) Each of the 10 exposures would be done at a different wavelength, for example, starting at 500 nm with each wavelength incremented by 0.1 nm. In this sequence, for each 100 ms of camera integration time, 10 exposures would be done with wavelengths 500.0, 500.1, 500.2, . . . , 500.9 nm. The total effect of such exposure would be equivalent to that of an interferometer seeing a single source composed of ten individual wavelengths so described. Following the equations described in U.S. Pat. No. 8,422,026, the interference fringes would be visible at a distance of 2.5 mm from the reference surface.

As would be understood by those skilled in the art, stepping through wavelengths, as described above, is not the only way to implement time wavelength multiplexing. The wavelength change in time can be done in a continuous way as well and the integration time can be subdivided into unequal fractions. By properly adjusting the rate of wavelength change, it is possible to produce arbitrary spectral distributions of the source within the duration of exposure time. For example, an approximately sinusoidal distribution of the spectral power can be implemented, which is very desirable for many applications. Such an approach would also make it possible to create sources with arbitrary spectral properties designed to compensate for undesirable system effects (e.g., reflections on thin films or other optically not-neutral interfaces), as also described in U.S. Pat. No. 8,422,026.

Figure 2:
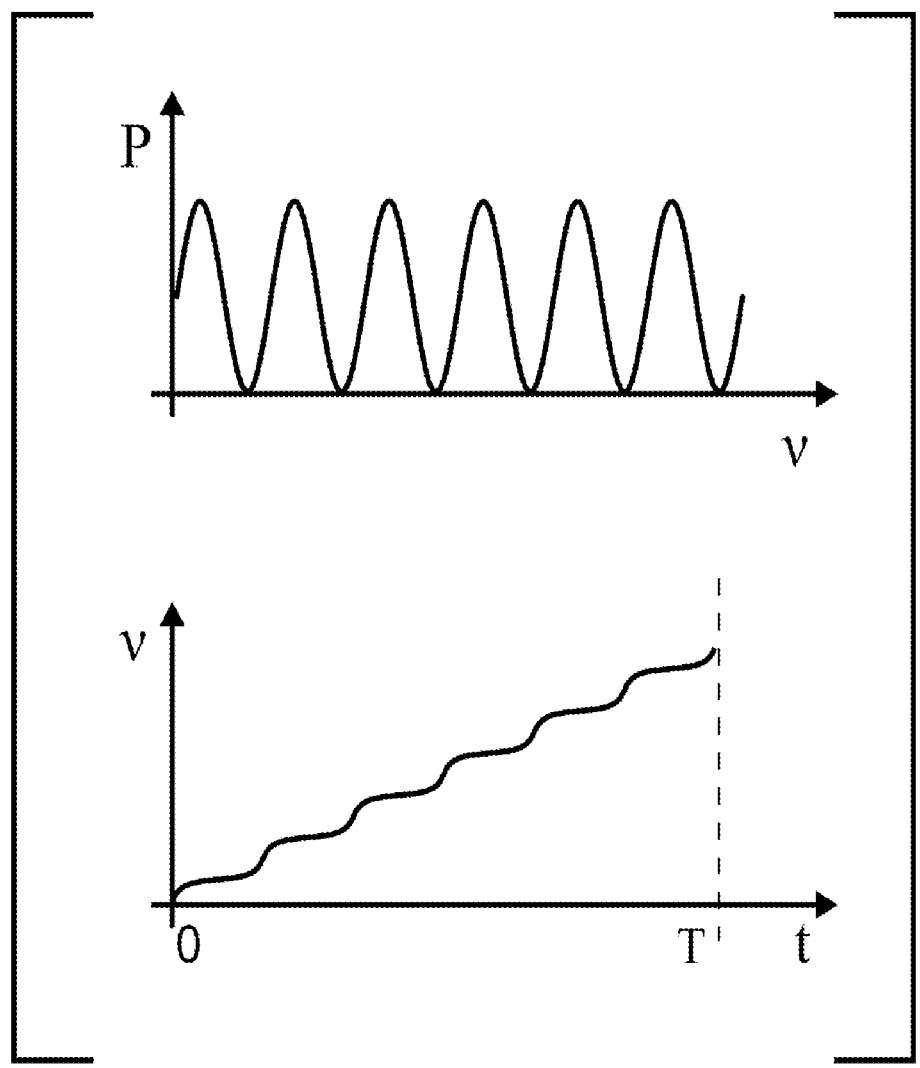
FIG. 2 illustrates the time and power graphs of a continuous time-averaged exposure. The upper graph shows the spectral power of the source accumulated during a single integration time T of the detector. The lower graph shows the optical frequency variation with time needed to achieve the power effect of the upper graph. The frequency is varied continuously during the integration time.

FIG. 2 shows graphs corresponding to an exemplary continuously varying source. The symbol v denotes the optical frequency of the source, P is power, and t is time. The upper graph shows the cumulative distribution of power from a source where the wavelength is tuned continuously over the period of one integration time in order to achieve a sinusoidal modulation of the spectral power. The lower graph shows the change of wavelength over time required to achieve the sinusoidal modulation of the spectrum shown in the upper graph. Such modulation would need to be carried out during each integration time of the detector.

Figure 3:
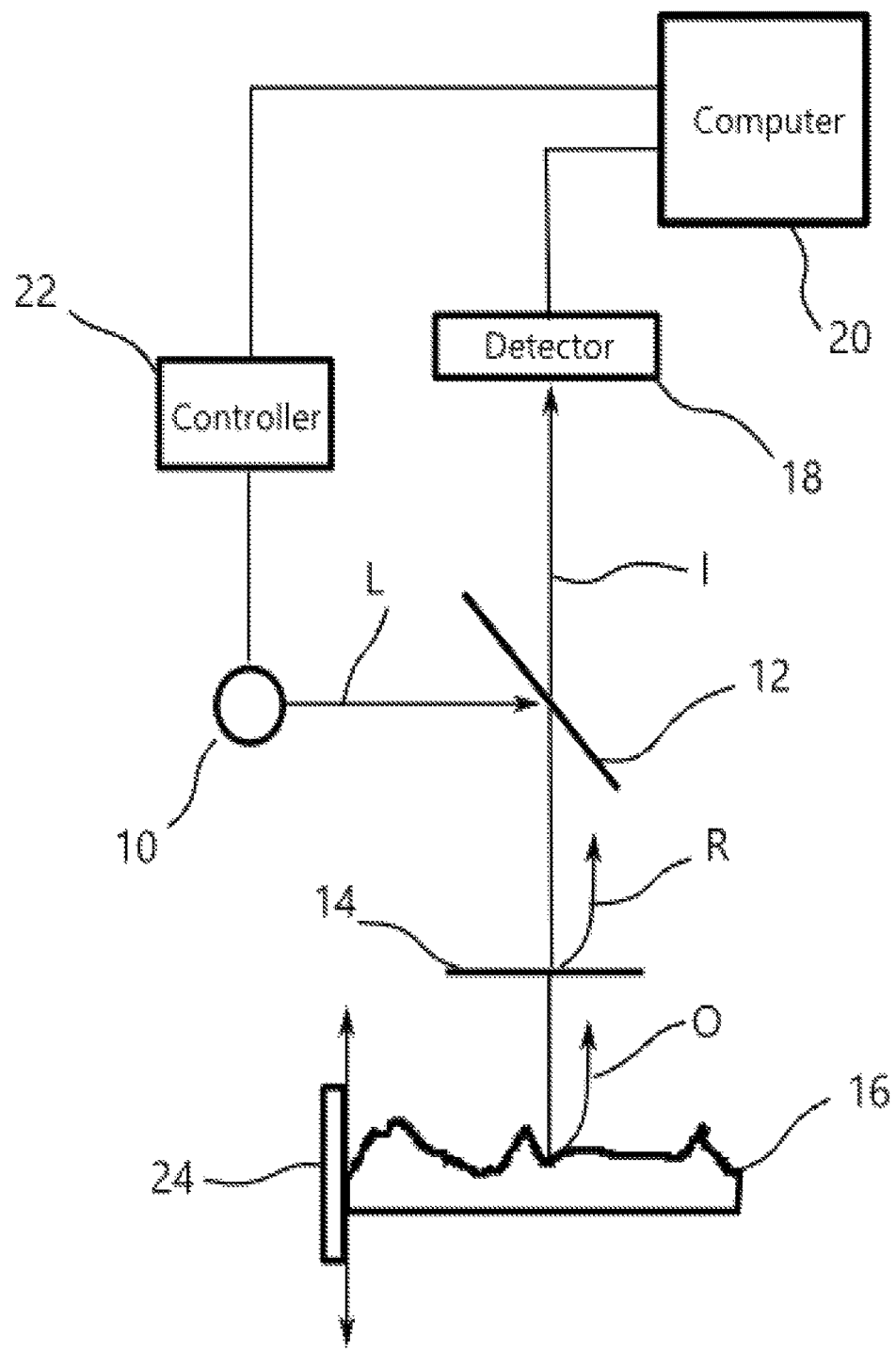
FIG. 3 is a schematic illustration of a conventional Fizeau interferometer adapted to practice spectrally controlled interferometry according to the invention.

FIG. 3 illustrates schematically an example of a Fizeau interferometer adapted to practice spectrally controlled interferometry according to the invention. A tunable monochromatic laser source 10 produces a light beam L that is reflected by a beam-splitter 12 toward a transparent reference flat 14 and an axially aligned object surface 16. Upon reflection of the light L from each surface, a reference beam R and an object beam O are produced and returned on axis toward the beam-splitter 12. The beams are recombined, thereby producing interference, and are passed back through the beam-splitter to a detector 18 and processor 20 for recording the signal and performing interferometric analysis. According to the invention, the light source 10 is modulated, either stepwise or continuously, as described, by means of an appropriate spectral controller 22 to produce a plurality of different frequencies and corresponding interference fringes during sequential fractions of the integration time of the detector, so as to form and record during each integration time a multiplexed correlogram pattern corresponding to the superposition of the signals so acquired. As taught in the art of spectrally controlled interferometry, the spectral distribution of the light source is modulated in the frequency domain to produce a predetermined spatial pattern of interference fringes between the reference beam R and an object beam O such that a peak of the pattern of interference fringes is localized at the detector 18 when the OPD between the reference and object beams is equal to a predetermined optical length.

The measurement is then carried out, for example, by repeating the modulation and spectral distribution emitted by the light source at each integration time while sequentially changing the period of modulation to produce a succession of predetermined spatial patterns of interference fringes that are then processed with conventional interferometric analysis tools. Alternatively, the spectral distribution of the source is modified to sequentially produce phase changes between the reference and object beams. In all cases, the object O can be measured without the use of the shifting mechanism 24 provided to shift the position of the test object (or the reference mirror) for phase-shifting measurements in conventional Fizeau operation.

Thus, a new approach has been described for implementing spectrally controlled interferometry with all of its modalities of operation by using time-dependent modulation of the source wavelength. This can always be achieved if the following two conditions are met. First, the source can be considered temporally coherent for the purpose of the interferometric setup, as defined above; that is, at any given time interference fringes can be detected within the measurement space of the apparatus used to implement SCI. This typically means that the coherence length of the source is larger than the optical path difference in the setup. The second condition is that the wavelength can be changed at a rate high enough to integrate a meaningful number of exposures during the detector integration time; that is, a number of exposures sufficient to reproduce the wideband effect of a white-light source or an extended source.

The time-dependent modulation of the wavelength of a monochromatic source can be a very attractive alternative to using sources where the entire modulated spectrum is generated at once. It allows for greater flexibility in shaping the resulting spectral density and can be realized using technology available today.

As described above, all aspects of the invention apply to a single integration time of the detector. However, it is understood that the invention requires the acquisition of multiple detector exposures as needed for conventional interferometric analysis, each integration cycle using the same or a different wavelength modulation scheme. For example, in order to create a fringe pattern that is stationary in space, the same modulation of the source would be repeated for each integration time. Alternatively, the modulation could be varied from one integration time to another to achieve the effect of moving the fringes in space. This particular feature allows implementation of WLI modality without moving parts. In general, time multiplexing of the source according to the invention allows implementation of all techniques described in the prior art, including shifting of the phase of the interference fringes by changing the phase of the sinusoidal modulation of the source.

The time-multiplexing aspect of the invention requires that the test object and the interferometer are in a quasi-static state during the total time of exposure during each integration time, such that each corresponding image is equivalent to that produced by a modulated white-light source, or at least the apparatus must behave in a predicable fashion that can be accounted for in the analysis. Furthermore, as outlined above, the interference fringes must be observable at all times in order to produce time-averaged interferograms. Therefore, high-coherence tunable sources are required, especially for setups with large OPDs.

The approach described above represents a basic implementation of a spectrally controlled source. It outlines the physical principle of operation and establishes a basic mathematical description. However, those skilled in the art will recognize that several modifications are possible to efficiently use available technology. For example, it is possible to combine several "partial" images to create the total modulation effect in a scheme where several images are taken, each for a subset of the total intended spectral modulation range, and then combined by non-optical means (such as by adding the images electronically or numerically). For example, in a case where the modulation speed of the source is insufficient to cover the entire wavelength range in a single integration time, the range could be split into subsections and the entire intended spectrum could be covered in multiple integration times, each for a given subsection of the entire spectral range.

It is also possible to use spectrally extended (non-monochromatic) sources to create the desired effect as long as the interference fringes are visible and the time integral of the cumulative distribution produces the desired spectrum. The light source does not need to be continuous, as it is possible to expose the detector using light pulses with the appropriate time/wavelength modulation to produce the desired accumulated spectrum.

Thus, while the invention has been shown and described herein in what is believed to be the most practical and preferred embodiments, it is recognized that departures can be made therefrom within the scope of the invention. Therefore, the invention is not to be limited to the disclosed details but is to be accorded the full scope of the claims, including any and all equivalents thereof.

The invention claimed is:

1. A method of producing interferometric measurement signals for spectrally controlled interferometry with an interferometric apparatus having a predetermined optical path difference, comprising the following steps:

providing a monochromatic light source having a temporal coherence such that interference-fringe signals are detected within a measurement space of the interferometric apparatus, said light source being capable of spectral modulation; and sequentially exposing a detector of said interferometric apparatus to independently formed interference-fringe signals produced by respective different wavelengths emitted by the light source to produce a multiplexed correlogram pattern;

wherein said interference-fringe signals are produced during respective fractions of an integration time of the detector; and wherein the light source is modulated in an optical frequency domain to produce a predetermined spatial pattern of interference fringes with a single peak localized within said measurement space of the interferometric apparatus.

2. The method of claim 1, wherein said different wavelengths emitted by the light source are produced as a result of a stepwise modulation.

3. The method of claim 1, wherein said different wavelengths emitted by the light source are produced as a result of a continuous modulation.

4. The method of claim 3, wherein said modulation is sinusoidal.

5. The method of claim 1, wherein said fractions of the integration time of the detector are equal.

6. The method of claim 1, further repeating the step of sequentially exposing the detector to independently formed interference-fringe signals at subsequent integration times of the detector while sequentially changing said modulation to produce a succession of multiplexed correlogram patterns.

7. The method of claim 6, further comprising the step of processing said multiplexed correlogram patterns with interferometric analysis tools.

8. The method of claim 7, wherein said fractions of the integration time of the detector are equal.

9. The method of claim 4, further repeating the step of sequentially exposing the detector to independently formed interference-fringe signals at subsequent integration times of the detector while sequentially changing said modulation to produce a succession of multiplexed correlogram patterns.

10. The method of claim 9, further comprising the step of processing said multiplexed correlogram patterns with interferometric analysis tools.

11. The method of claim 10, wherein said fractions of the integration time of the detector are equal.

12. An interferometer for spectrally controlled interferometric measurements, comprising:

a monochromatic light source having a temporal coherence such that interference-fringe signals are detected within a measurement space of the interferometer, said light source being capable of spectral modulation; and a spectral controller adapted to modulate the light source to produce a plurality of different frequencies and corresponding interference-fringe signals during sequential fractions of an integration time of a detector of the interferometer, so as to form a multiplexed correlogram pattern corresponding to a superposition of said signals produced during the integration time, the spectral controller being further adapted to modulate the light source in an optical frequency domain to produce a predetermined spatial pattern of interference fringes with a single peak localized within said measurement space of the interferometer.

* * * * *